UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLACK DISAZO DYE.

SPECIFICATION forming part of Letters Patent No. 644,233, dated February 27, 1900.

Application filed September 10, 1898. Serial No. 690,649. (Specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of a New Group of Disazo Dyes, of which the following is a specification.

My invention consists in secondary disazo dyes which can be obtained from a certain nitro-amido-phenol-sulfo-acid, a so-called "middle component"—namely, alpha-naphthylamin or the alpha-naphthylamin-sulfo-acid—known as "cleves," which is a mixture of 1.6 and 1.7 sulfo-acid, and a further component—namely, beta-naphthol, alpha-naphthylamin or naphthol-sulfo-acid, (1.4 or 1.5,) ethyl-beta-naphthylamin, 1.8-naphthylamin sulfo-acid, beta-naphthol-disulfo-acid R, and 1.3.6-alpha-naphthol-disulfo-acid.

The nitro-amido-phenol-sulfo-acid which I use in this invention has been described in the specification of German Letters Patent No. 93,443, and the constitution

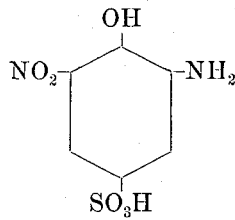

has been attributed to it—that is to say, it is regarded as a para-sulfo-acid of ortho-nitro-ortho-amidophenol. The monoazo dyes which have hitherto been prepared from this nitro-amido-phenol-sulfo-acid do not withstand the action of even dilute acids and are therefore of no practical value. If, however, the nitro-amido-phenol-sulfo-acid be combined with alpha-naphthylamin or its sulfo-acid hereinbefore defined and the intermediate product so obtained be again diazotized and the diazo compound combined with the suitable components hereinbefore mentioned, then the new disazo coloring-matters obtained are not merely free from this disadvantage, but possess other valuable properties, including great strength of coloring power and excellent fastness to light.

My new coloring-matters dye wool, giving blue to bluish-black shades, and they possess the further important quality that if the dyed goods be treated with chromates a more greenish shade results and the color becomes extraordinarily fast to light and resists fulling very well.

The following example will serve to illustrate the manner in which the invention can be carried into practical effect and my new dyes obtained:

Example: Dissolve about twenty-three and a half (23½) parts of the nitro-amido-phenol-sulfo-acid hereinbefore defined in about five hundred (500) parts of water and diazotize by treatment with about fifteen (15) parts of hydrochloric acid (containing about thirty (30) per cent. HCl) and about seven (7) parts of sodium nitrite at the ordinary temperature. Pour the diazo solution into a solution of about fifteen (15) parts of alpha-naphthylamin in six hundred (600) parts of water and fifteen (15) parts of hydrochloric acid, (containing about thirty (30) per cent. HCl.) Stir at a temperature of about from thirty-five (35) to seventy-five (75) degrees centigrade till a test portion on filter-paper gives no reaction of diazo compound. This usually requires from ten (10) to twenty-four (24) hours, the time depending principally upon the temperature maintained. Filter the intermediate coloring-matter obtained and wash with cold water. Dissolve the intermediate coloring-matter in about two thousand five hundred (2,500) parts of boiling water, to which about seventeen (17) parts of caustic-soda lye (containing about thirty-five (35) per cent. NaOH) are added. Allow the solution to cool and add seven and a half (7½) parts of sodium nitrite in the form of a concentrated solution. Pour this mixture into a dilute sulfuric acid containing about two hundred (200) parts of ice, thirty (30) parts of sulfuric acid (containing about ninety-five (95) per cent. $H_2SO_4$,) and ninety (90) parts of water. Stir while mixing, and subsequently a precipitate separates out which is at first dark in color and gradually becomes brown.

Filter, stir with cold water, and pour into a solution of about twenty-five (25) parts of alpha-naphthol-alpha-sulfo-acid (1.4 or 1.5), which is rendered alkaline with carbonate of soda. The formation of coloring-matter is soon completed. Add common salt to complete the precipitation of the coloring-matter and filter and press. Purify, if necessary, by redissolving and precipitating. If desired, the combination can be effected without first collecting the diazo compound by filtration. The products obtained, whether 1.4 or 1.5 sulfo-acid be used, resemble one another so closely as to be practically identical.

The production of coloring-matters with other end components is effected similarly. When alpha-naphthylamin is used as end component, it is of course desirable to effect the combination in weakly-acid solution, and the coloring-matter formed is subsequently converted into its sodium salt.

My new group of coloring-matters are generally made in the form of dark-colored powders and are generically characterized by their behavior on reduction with ammonium sulfid in ammoniacal solution. When suitably reduced, a step-by-step reduction can be observed and an amido body can be obtained which can be diazotized and combined with R-salt, yielding an azo dye which is violet-blue in the presence of alkalies turning to intense red on treatment with hydrochloric acid, just like the R-salt azo dye of ortho-nitro-ortho-amido-para-sulfo-acid. This test can be effected as follows: Heat up one (1) gram of coloring-matter with one hundred cubic centimeters of water and add fifteen (15) cubic centimeters of ammonia (containing twenty (20) per cent. $NH_3$.) The solution is dark blue to violet in color. Add drop by drop to the nearly-boiling solution some fresh ammonium sulfid. The liquid turns through to deep red or red-brown. This marks the first step of the reduction. Add more ammonium sulfid, drop by drop, avoiding any considerable excess, and continue the treatment. The liquid turns brown or more brownish. This marks another stage of the reduction, and the liquid contains the nitro-amido-phenol-sulfo-acid reproduced. Cool the liquid, add excess of hyrochloric acid, diazotize with sodium nitrite, filter, and run the diazo solution into an alkaline solution of R-salt containing, say, two (2) grams R-salt and twelve (12) grams soda in one hundred and twenty (120) parts water. A violet-blue azo dye is obtained which turns to red in the presence of hydrochloric acid.

Besides protecting by these Letters Patent my new group of dyes generically, I desire to specifically claim the product obtained when using alpha-naphthol-alpha-sulfo-acid (1.4 or 1.5) as end component. This product possesses the generic properties of the group, behaving as hereinbefore described on reduction with ammonium sulfid, and is further characterized by yielding a dull-green solution in concentrated sulfuric acid.

The coloring-matter yields, when dissolved in one thousand times its weight of water, a deep-blue solution. On adding a little caustic soda to this solution no perceptible change of color can be noticed in bulk. With ferric chlorid a precipitate is obtained which may be reddish-brown to violet. Hydrochloric acid turns the solution first violet-red. This may change on standing or treatment with large excess and a precipitate form.

Now what I claim is—

1. As a new article of manufacture the disazo coloring-matters which can be derived from ortho-nitro-ortho-amido-phenol-sulfo-acid, and which on suitable reduction with ammonium sulfid in ammoniacal solution exhibit a step-by-step reduction reproducing the nitro-amido-phenol-sulfo-acid, all substantially as described.

2. As a new article of manufacture the specific new coloring-matter which can be derived from ortho-nitro-ortho-amido-phenol-sulfo-acid, alpha-naphthylamin and alpha-naphthol-alpha-sulfo-acid (1.4 or 1.5) and which on suitable reduction with ammonium sulfid in ammoniacal solution exhibits a step-by-step reduction reproducing the nitro-amido-phenol-sulfo-acid and which yields a dull-green solution in concentrated sulfuric acid, a deep-blue solution when dissolved in water, no perceptible change of color in bulk on the addition of a little caustic soda, a reddish-brown to violet precipitate with ferric chlorid, and a violet-red with hydrochloric acid which may change on standing or treatment with large excess and a precipitate form, all substantially as described.

In testimony whereof I have hereunto set my hand in the presence of two subscribing witnesses.

PAUL JULIUS.

Witnesses:
BERNHARD C. HESSE,
ADOLPH REUSTINGER.